United States Patent [19]

Messinger

[11] Patent Number: 5,793,974
[45] Date of Patent: Aug. 11, 1998

[54] NETWORK NAVIGATION AND VIEWING SYSTEM FOR NETWORK MANAGEMENT SYSTEM

[75] Inventor: Frederic P. Messinger, Groton, Mass.

[73] Assignee: Sun Microsystems, Inc., Palo Alto, Calif.

[21] Appl. No.: 497,545

[22] Filed: Jun. 30, 1995

[51] Int. Cl.$^6$ ................................................ G06F 13/00
[52] U.S. Cl. ............................. 395/200.54; 395/200.53; 364/491
[58] Field of Search ........................ 395/161, 159, 395/181.1, 200.53, 200.54; 364/491

[56] References Cited

U.S. PATENT DOCUMENTS

| | | | |
|---|---|---|---|
| 5,261,044 | 11/1993 | Dev et al. | 395/159 |
| 5,295,244 | 3/1994 | Dev et al. | 395/161 |
| 5,471,399 | 11/1995 | Tanak et al. | 364/491 |

FOREIGN PATENT DOCUMENTS

| | | |
|---|---|---|
| A-0 457 445 | 11/1991 | European Pat. Off. |
| WO-A-92 05485 | 4/1992 | WIPO. |

OTHER PUBLICATIONS

Elektronik, vol. 40, No. 22, 29 Oct. 1991, pp. 59–62, 64–65, 68–69, Mueller, R.: LON–Das Universelle Netzwerk Teil 1 Ein Neuartiges Konzept, Um Steuergeraete, Sensoren und Aktoren Miteinander "Sprechen" Zu Lassen.

Elektronic, vol. 40, No. 23, Nov. 1991, pp. 75–76, 78, 80–82, Mueller, R.: LON–Das Universelle Netzwerk Teil 2.

*Primary Examiner*—Parshotam S. Lall
*Assistant Examiner*—Saleh Najjar
*Attorney, Agent, or Firm*—Richard Jordan

[57] ABSTRACT

A network navigation and viewing system is disclosed for use in managing a network. The network includes a plurality of digital devices interconnected by communication links in at least one domain, with each device having a device identifier and each domain having a domain identifier. The network navigation and viewing system facilitates generation of a graphical image depicting a logical organization of the network. The network navigation and viewing system in one aspect retrieving device identifier and domain identifier information for the devices connected in the network and uses them to generate a network organization graphical image for display to an operator, the image comprising a plurality of icons each representing a device, with the icons being aggregated in the network organization graphical image by domain thereby to depict the logical organization of the network. The system further enables the operator to use the network organization graphical image generate a further graphical image representing the three-dimensional physical layout of the computers in an office or other environment. In addition, the system will generate a network usage graphical image representing certain communications sessions between devices over the network.

5 Claims, 10 Drawing Sheets

NETWORK NAVIGATION AND VIEWING SYSTEM FOR NETWORK MANAGEMENT SYSTEM

FIELD OF THE INVENTION

The invention relates generally to the field of digital data processing systems, and more particularly to systems and methods for assisting in management of large computer networks which may extend over a three-dimensional volume of space, for example, a number of floors in an enterprise environment. The invention provides a network navigation and viewing subsystem which may be used in connection with a system for managing a network. The network navigation and viewing subsystem may be useful for, for example, a network manager to enable him or her to visualize the layout of computers in an multiple-floor enterprise setting, such as in an office environment, and to visualize usage of various server devices by client devices in the system

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations are used by individual workers to perform processing in connection with data and programs that may be stored in the network mass storage subsystems; the personal computers/workstations, operating as clients, download the data and programs from the network mass storage subsystems process the data in connection with the programs and enable the processed data to be uploaded to the network mass storage subsystems for storage, to a network printer for printing, or to the telephony interface for transmission over the public telephony system. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations are interconnected by communication links such as electrical wires or optic fibers.

SUMMARY OF THE INVENTION

The invention provides a new and improved network navigation and viewing system for use in connection with management of a network of computers and other digital devices, in particular facilitating the generation of graphical images providing information as to the layout and status of various devices connected to the network and of communications among the various devices which may extend over three-dimensional volume of space such as a number of floors in an enterprise environment.

In brief summary, in one aspect the network navigation and viewing system is disclosed for use in managing a network that includes a plurality of digital devices interconnected by communication links in at least one domain, with each device having a device identifier and each domain having a domain identifier. The network navigation and viewing system facilitates generation of a graphical image depicting a logical organization of the network. The network navigation and viewing system includes a device identifier/domain information access element for retrieving device identifier and domain identifier information and a device/domain graphic image generation element for using the device identifier and domain identifier to generate a network organization graphical image for display to an operator. The network organization graphical image comprises a plurality of icons each representing a device, the icons being aggregated in the network organization graphical image by domain thereby to depict the logical organization of the network. A operator control element is responsive to the operator initiating a network logical organization image generation operation to enable the device identifier/domain information access element to retrieve the device identifier and domain identifier information for the devices comprising the network, and the device/domain graphic image generation element to generate a logical organization image in response thereto.

In a refinement, the network navigation and viewing system allows the operator to associate ones of the icons of the network logical organization image with a physical layout image defining the three-dimensional layout of a physical space in which the network is located. In that aspect, a physical layout image generator generates an image defining a physical layout image for display to the operator and an operator-actuable icon manipulator enables the operator to manipulate the icons in relation to the physical layout image to associate ones of the icons with portions of the physical layout image.

In a further aspect, the network navigation and viewing system facilitates the generation of a communication pattern image which depicts communications patterns in the network. The network navigation and viewing system includes a server interrogation element for retrieving session information from the server device, said session information identifying ones of the devices having a processing session with said server device as a client device. A communications pattern graphic image generation element uses the session information in generating a communications pattern image for display to an operator. The communications pattern graphic image comprises a plurality of icons each representing a server device or a client device and provides a visible association associating ones of the client devices having a communications session with each server device. The operator control element is responsive to the operator initiating a communications session image generation operation to enable the server interrogation element to retrieving session information from said server device and the communications patter graphic image generation element to use the session information in generating a communications pattern image.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
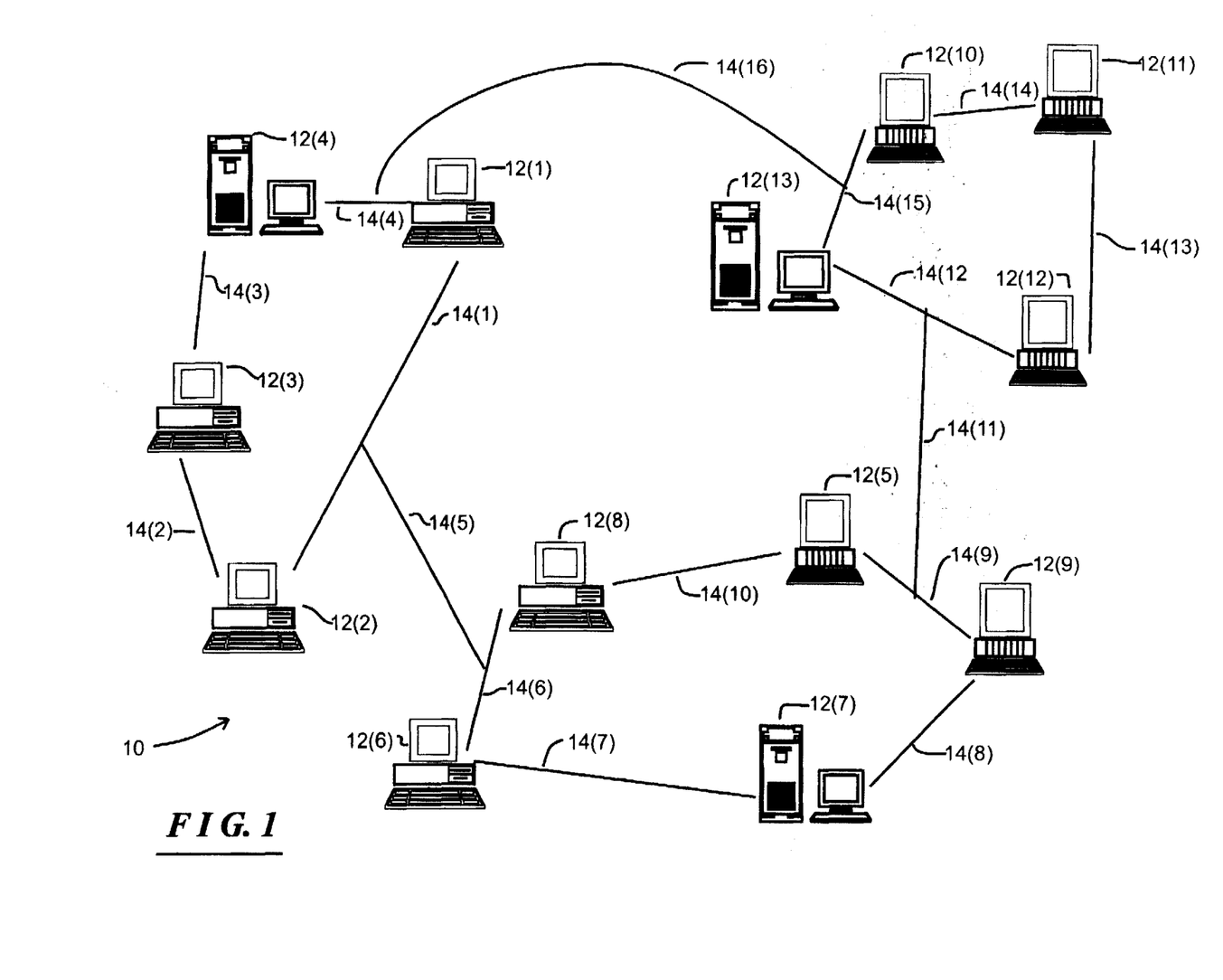
FIG. 1 is a schematic diagram of a computer network including a network navigation and viewing system in accordance with the invention.

FIG. 1 is a schematic diagram of a computer network 10 including a network navigation and viewing system in accordance with the invention. The network navigation and viewing system provides an arrangement which can assist a network manager or other person (generally referred to herein as an "operator") in maintaining and managing the network 10, in particular by providing graphical images depicting information concerning configuration, layout and operational status of the network. In one embodiment, the network navigation and viewing system in particular provides graphical images depicting the various computers that are connected to the network as well as various sub-domains into which the network may be divided, and also provides information as to their operational status. The operational status may indicate, for example, whether the computers are operating properly or malfunctioning or otherwise non-operational. In addition, the network navigation and viewing system enables an operator to graphically associate the various computers in the network 10 with the physical locations in, for example, an office area or other space, so that he or she can later use such associations in maintaining the network, and locating computers connected in the network which may have malfunctioned. Further, the network navigation and viewing system can enable generation of images for graphically depicting network traffic, in particular depicting computers, operating as clients in the network, which have open sessions with the computers that are operating as servers. Such information may be useful in determining whether sufficient server or network bandwidth capacity exists in the network, whether more should be provided, whether various files should be moved or copied from one server to another to improve response time, and in addition whether computers should be connected differently in the network.

With reference to FIG. 1, computer network 10 as depicted there includes a plurality of computers 12(1) through 12(13) (generally identified by reference numeral 12(n)) which are interconnected by communication links 14(1) through 14(M) (generally identified by reference numeral 14(m)). As is conventional, at least some of the computers are in the form of personal computers or computer workstations, each of which includes a system unit, a video display unit and operator input devices such as a keyboard and mouse. The system unit generally includes processing, memory, mass storage and other elements, including devices for interfacing the computer into the network 10. The video display unit will permit the computer to display processed data and processing status to the user, and the operator input devices enable the user to input data and control processing by the computer. In one embodiment, the network 10 is organized in a "client-server" configuration, in which some of the computers, illustrated as computers 12(4), 12(7) and 12(13) in FIG. 1, operate as servers, and the other computers operate as clients. Typically, the servers store copies of programs and data which are available for retrieval by the client computers over the communication links 14(m) for use in processing. The server computers may be generally similar to the client computers, including a system unit, video display unit and operator input devices and may be usable by an operator to process data in a manner similar to a client computer. Alternatively, at least some of the server computers may include only processing, memory, mass storage and network interface elements for receiving and processing downloading requests from the client computers, and generating responses thereto.

The communication links 14(m) interconnecting the computers 12(i) in the network 10 may, as is conventional, comprise wires, optical fibers or other media for carrying signals among the computers 12(n). As noted above, each of the computers 12(n) typically includes a network interface device, which connects the respective computer to the communications line 14(m) In addition, the communication links 14(m) may represent network routing nodes or other electronic devices for transferring signals originating at one of the computers 12(n), as a source, to be delivered to one or more other computers, as destinations.

Figure 4:
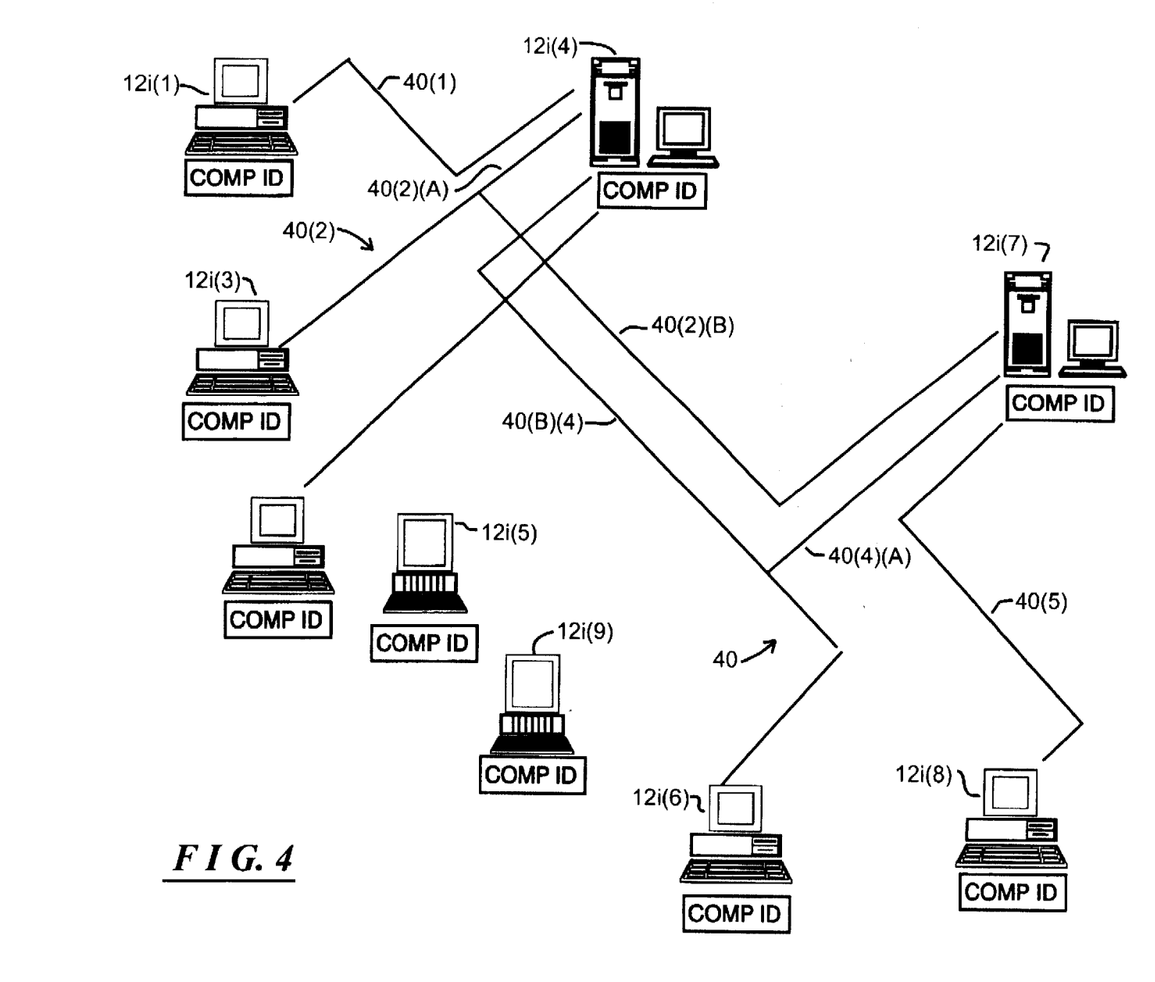
Figure 5:
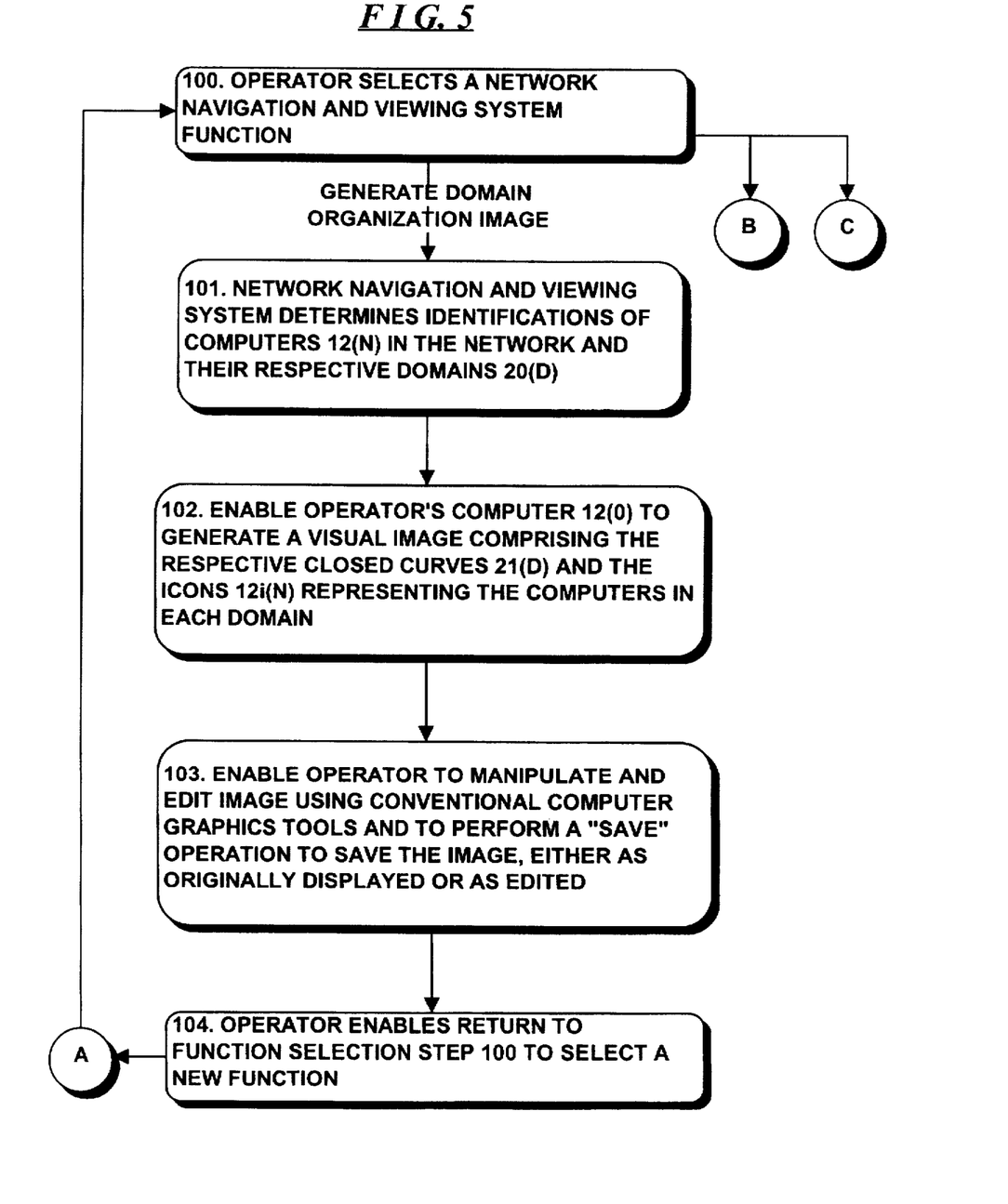
FIGS. 5, 5A–5C are a flow diagrams detailing operations performed by the network navigation and viewing subsystem.
Figure 5A:
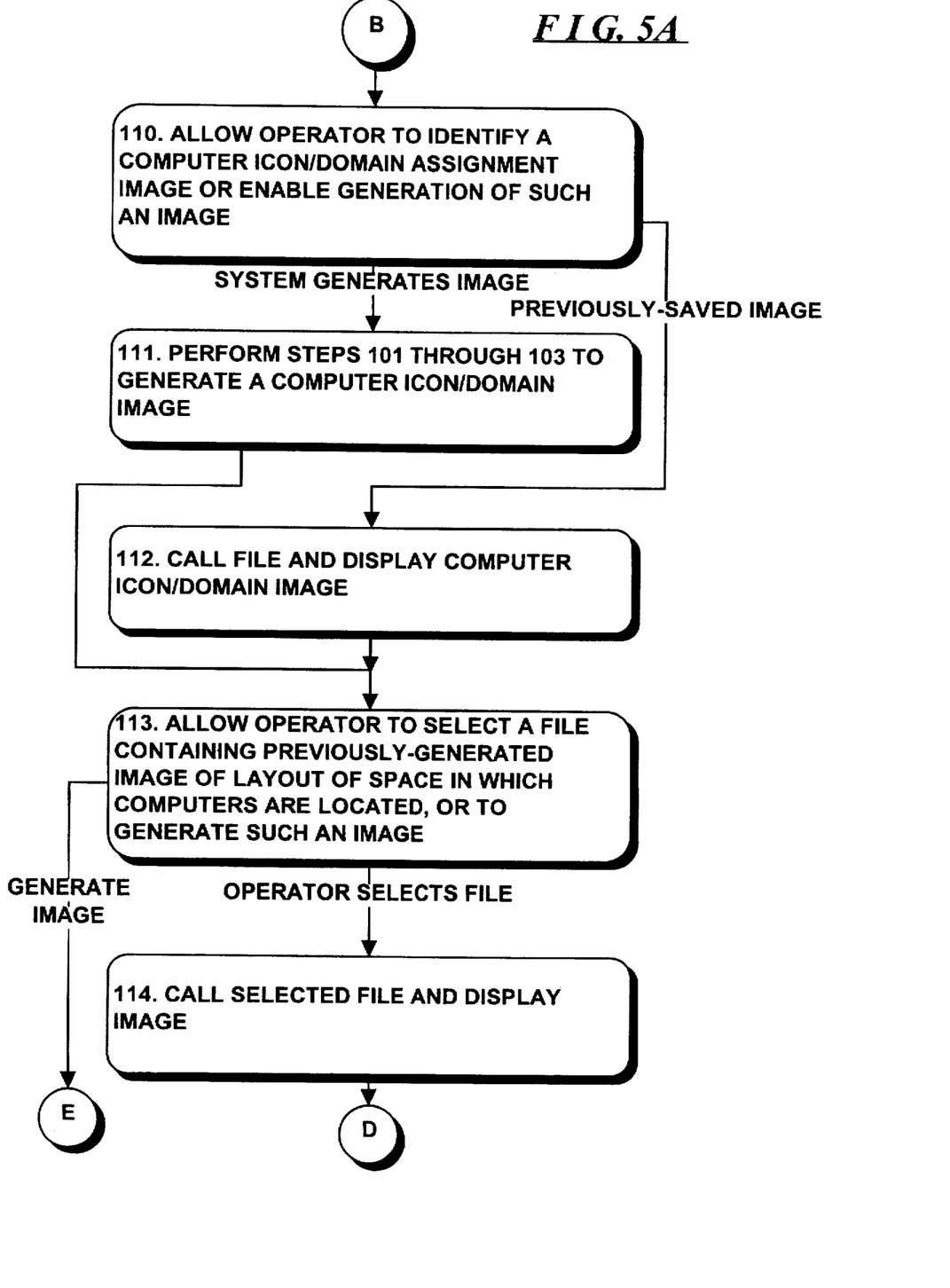
Figure 5B:
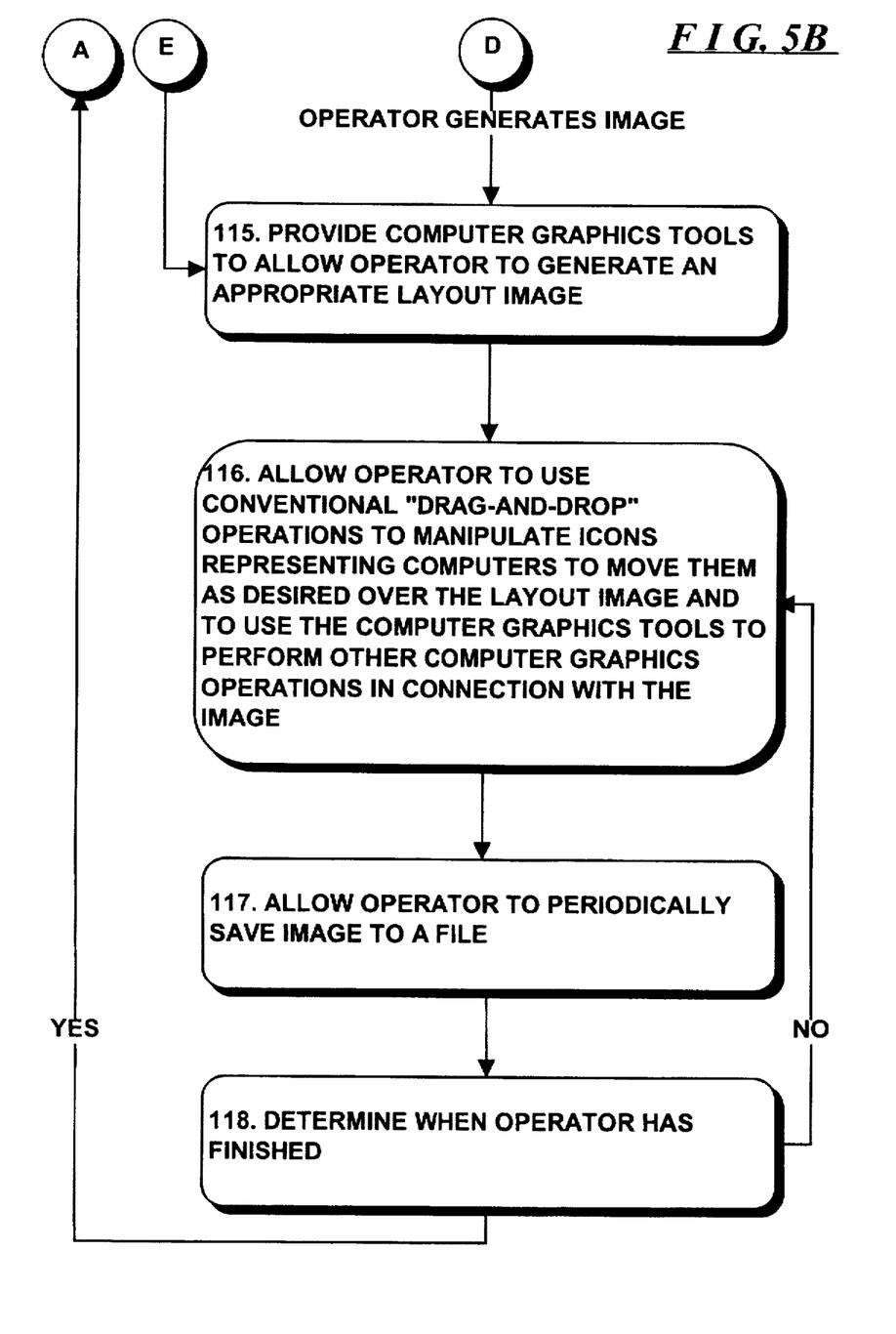
Figure 5C:
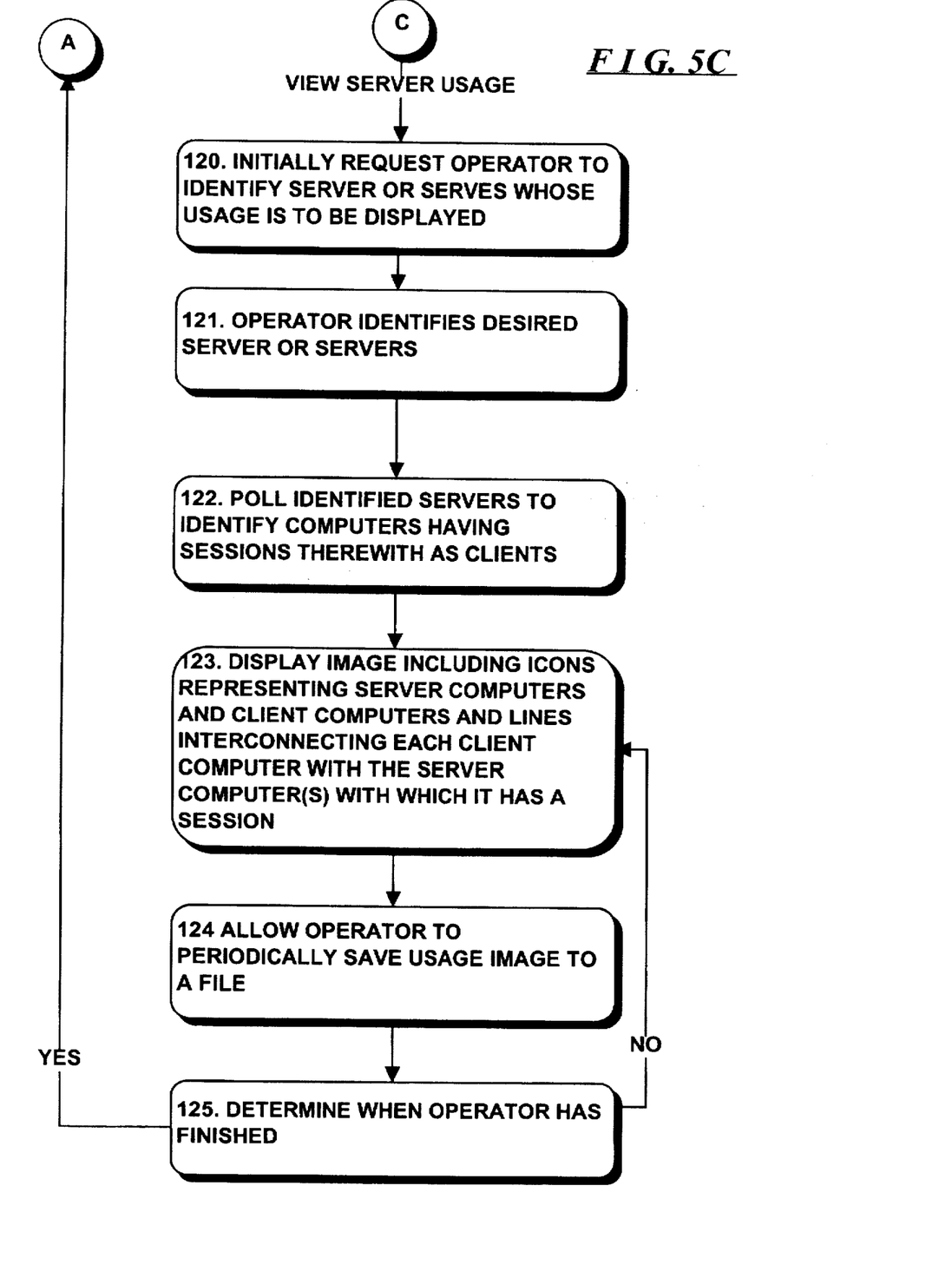

A detailed description of operations performed by a computer 12(n) in connection with the network navigation and viewing system in accordance with the invention will be provided below in connection with FIG. 5. Before proceeding to a description of the operations, it would be helpful to describe in detail types of information and the graphical visual images which are provided by one embodiment of the network navigation and viewing subsystem. The types of information provided by one embodiment of the network navigation and viewing system will be described in connection with FIGS. 2 through 4, which depict illustrative screen images generated by the network navigation and viewing system for display to the operator on the video display of the operator's computer, which may be one of the computers 12(n) in the network 10.

Figure 2:
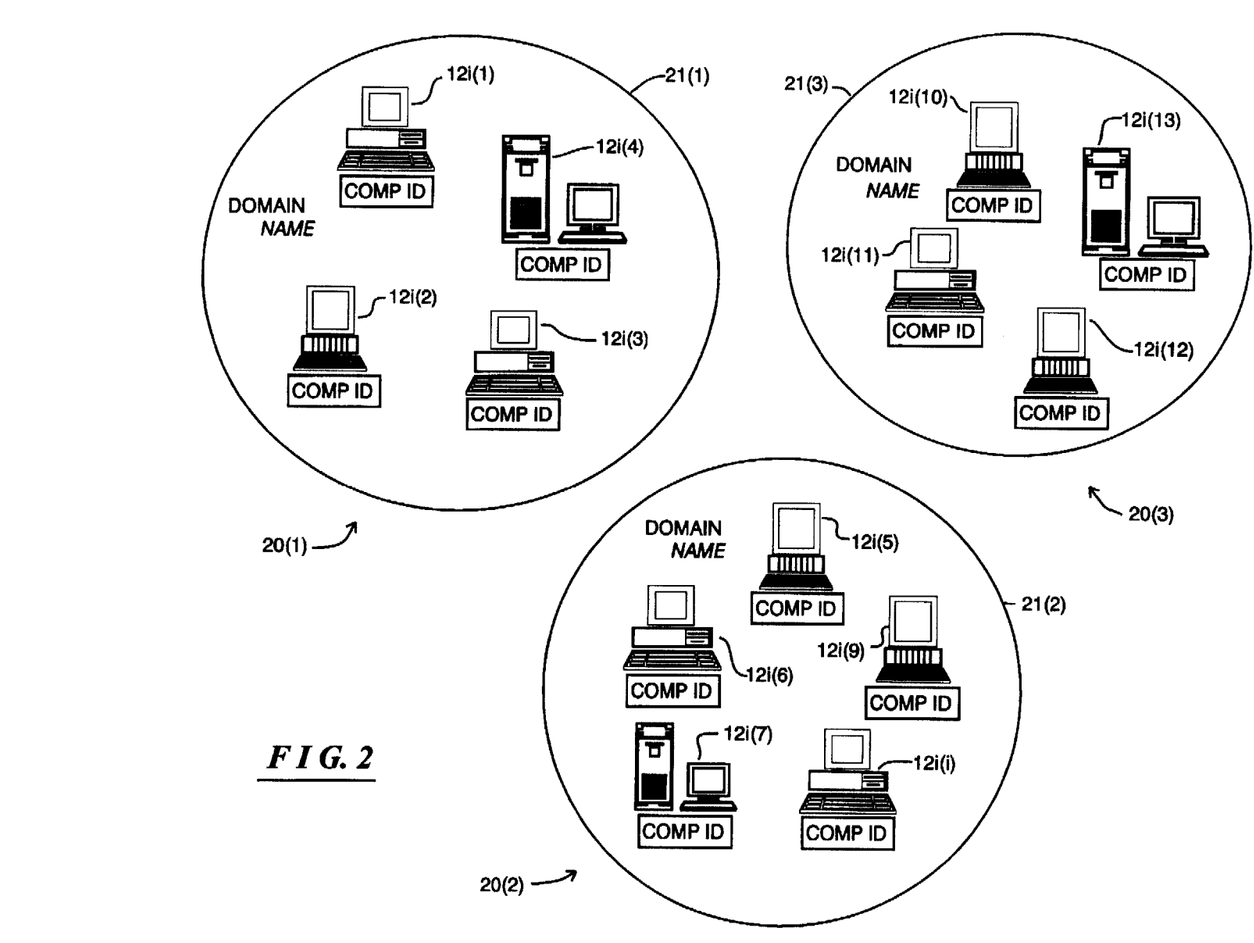
FIGS. 2, 3A, 3B, 3C, and 4 depict various screen displays provided by the network navigation and viewing system.

With reference to FIG. 2, that FIG. depicts a screen image in which icons 12i(n), representing the correspondingly-indexed computers 12(n) in the network 10, are displayed organized by domain, sub-domain, or other grouping (generally referred to herein as a "domain"). Proximate each icon 12i(n) is a network identifier for the associated computer 12(n), depicted in FIG. 2 by the legend "COMP ID" (referencing "COMPuter IDentification"). FIG. 2 illustrates a display in which the computers 12(n) are organized in three domains 20(1) through 20(3) (generally identified by reference numeral 20(d)) are depicted, with computers 12(1) through 12(4) being associated with domain 20(1), computers 12(4) through 12(9) being associated with domain 20(2), and computers 12(10) through 12(13) being associated with domain 20(3). (Although the domains 20(d) are shown as having a maximum of five computers 12(n), it will be appreciated that a domain may have any number of computers connected therein, and a network may include any number of domains.) Each domain 20(d) is shown as a grouping of the icons 12i(n) representing the computers along with their associated network identifiers COMP ID, surrounded by a closed curve 21(d). In FIG. 2, the enclosing curve 21(d) is depicted an oval, although it will be appreciated that any curve or polygon may be used. Each domain 20(d) is also identified by a domain name, which may be arbitrarily selected by a network manager, and the screen image also shows the name (illustrated by the legend "DOMAIN NAME" in FIG. 2) associated with the respective domain. It will be appreciated that, in the image shown in FIG. 2, neither the communication links 14(m) nor the specific media and other non-computer nodes comprising the network are shown, and so the image shown in the FIG. 2 is an image of the logical organization of the network, not an illustration of the network topology.

Figure 3A:
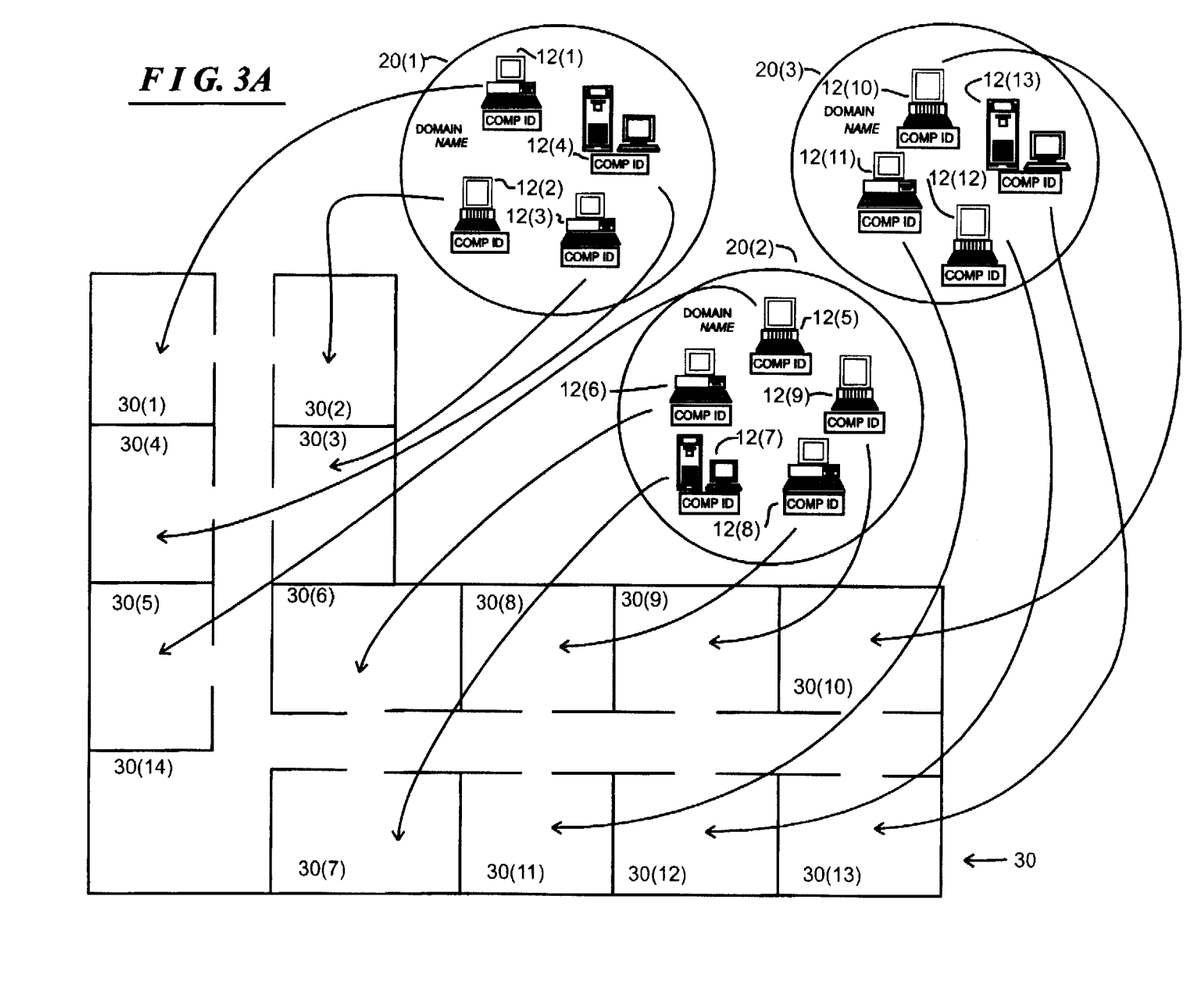

As noted above, the network navigation and viewing system further provides a facility by which an operator can graphically associate the computers 12(n) in the network with physical locations in an office area or other space in the "enterprise" in a two-dimensional space (such as on a floor in an enterprise) as well as in a three-dimensional volume (such as on multiple floors in an enterprise). This facility will be illustrated in connection with FIGS. 3A through 3C, which diagrammatically illustrate various stages in creating an image providing such a graphical association. With reference to FIG. 3A, that FIG. illustrates a screen image graphically illustrating an office area floor plan 30, including a number of office cubicles 30(1) through 30(14) (generally identified by reference numeral 30(c)), and the domains 20(d) with icons 12i(n) (and associated computer identifiers) which are illustrated in FIG. 2. With such an image, an operator may, by suitable manipulation of a pointing device such as a mouse, point to an icon 12i(n) to select it and the associated computer identifier, and, in a "drag-and-drop" maneuver, drag the selected icon (together with the associated computer identifier) to the cubicle 30(c) in which the associated computer 12(n) is physically located. In FIG. 3A, the arrows 31(1) through 31(13) (generally identified by reference numeral 13(n)) represent the operator "dragging-and-dropping" of the correspondingly-indexed icons 12i(n) to transfer the icons from their locations associated with the domains 20(d) to the respective cubicles 30(c). (It will be appreciated that the operator may require another source of information, such as an inventory listing in textual form the computer identifiers and the respective office identifiers indicating where the computers are located in the enterprise.)

Figure 3B:
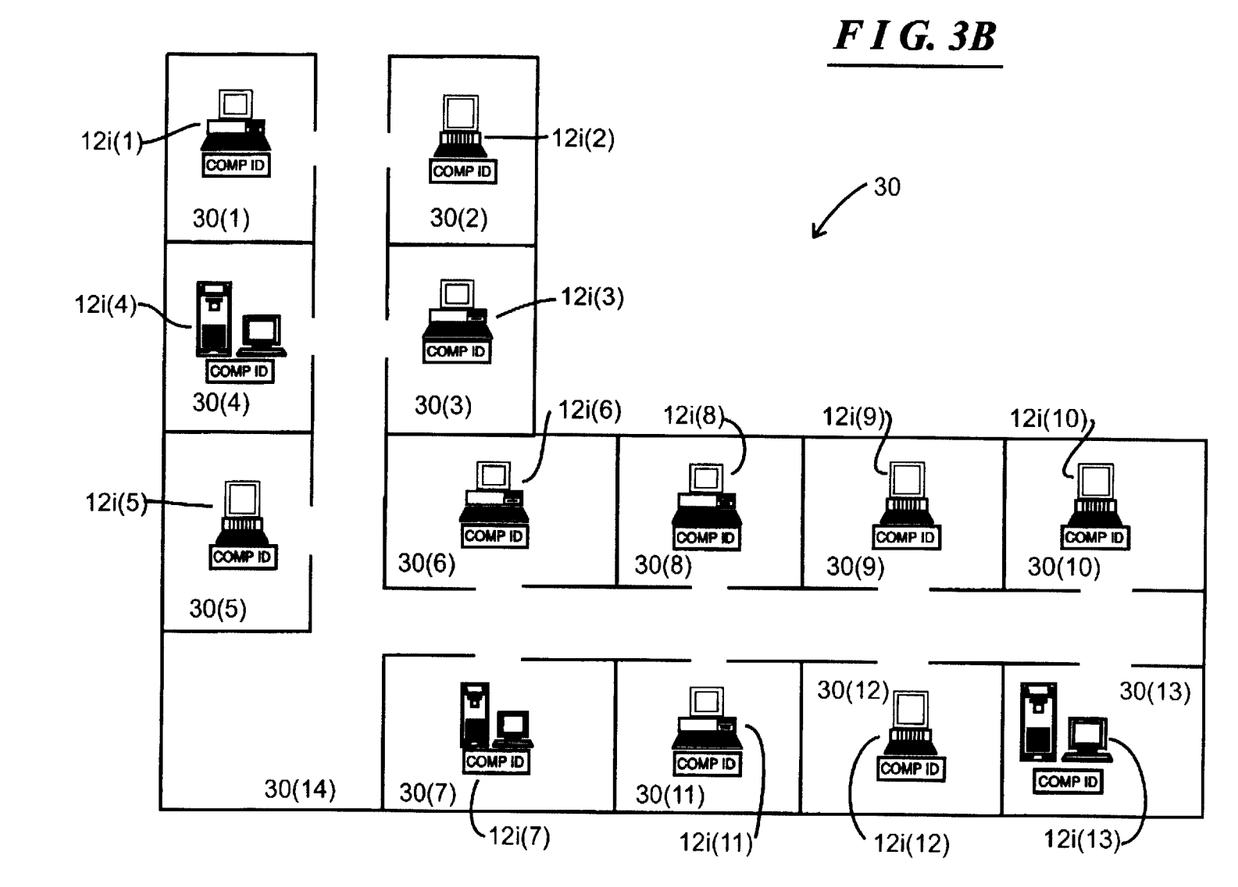

FIG. 3B graphically illustrates the floor plan shown in FIG. 3A after the operator has "dragged-and-dropped" all of the icons 12i(n) into the respective cubicles 30(c), to create a computer floor plan 32. As will be apparent from FIG. 3B, by locating the icons 12i(n) representing the respective cubicles 30(c) in the computer floor plan 32, if the operator determines that one of the computers has malfunctioned, he or she can obtain the malfunctioning computer's identification and quickly locate its physical location by referencing the computer floor plan.

Figure 3C:
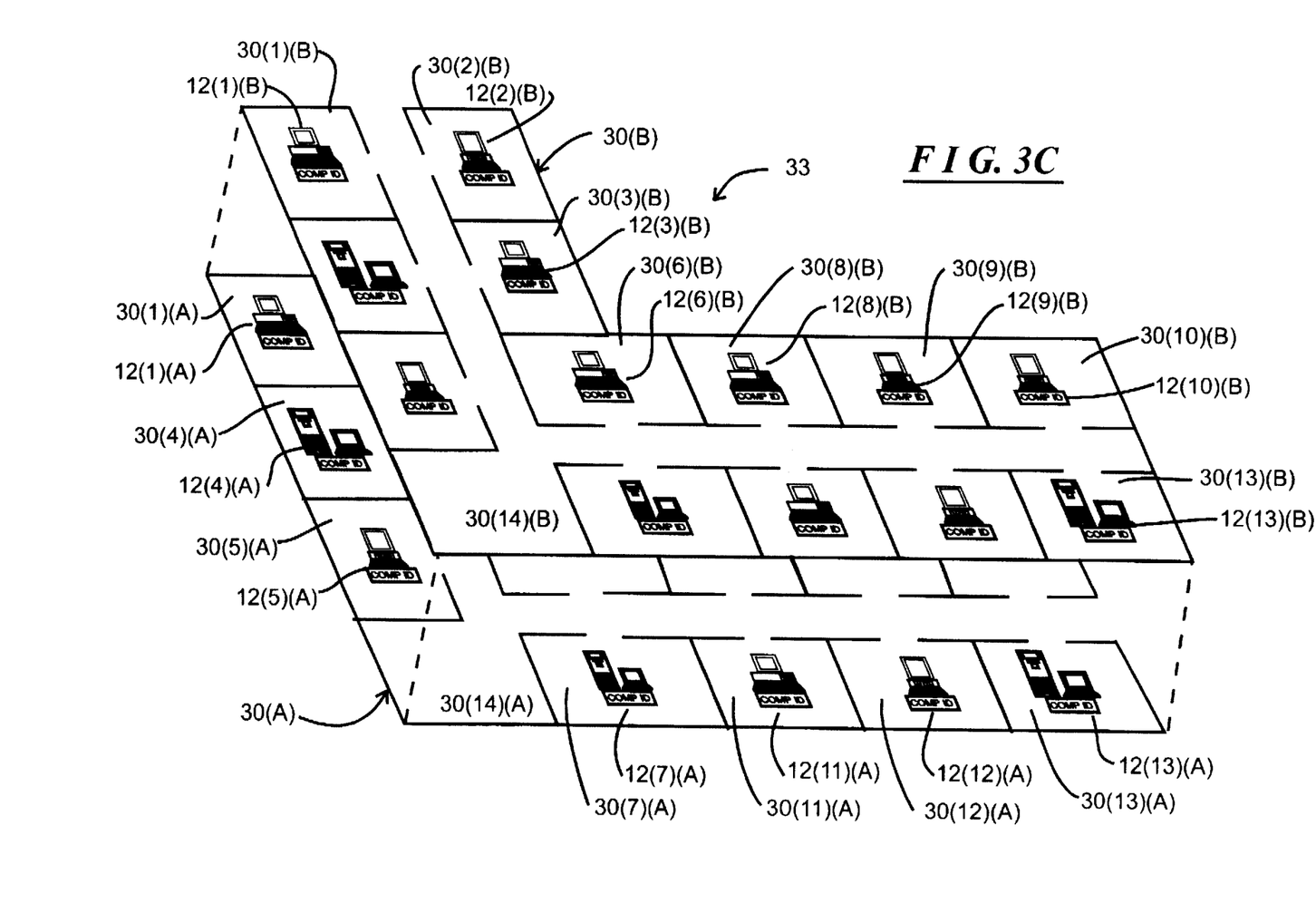

The operator may repeat the operations described above in connection with FIG. 3(B) for each of a number of floors at various elevations in an enterprise, and thereafter link the images so generated to create a three-dimensional floor plan for the enterprise. FIG. 3(C) graphically illustrates such a floor plan 33, comprising a plurality of floor plans 30(A) and 30(B) in the enterprise environment such as depicted in FIGS. 3A and 3B, representing the three-dimensional relationship therebetween; the floor plan 33 effectively represents a projection of the volume represented by the stacked floor plans 30(A) and 30(B) to form the two-dimensional image that is displayed on the computer system's display. In a manner similar to the two-dimensional (one floor) floor plan 32 depicted in FIG. 3B, by locating the icons 12i(n) representing the respective cubicles 30(c) in the computer floor plan 33 (FIG. 3(C)), if the operator determines that one of the computers on any of the floors represented by the floor plan 33 has malfunctioned, he or she can obtain the malfunctioning computer's identification and quickly locate its physical location, including the floor and location on the floor, by referencing the floor plan 33. Using conventional computer graphics techniques, the operator may rotate the volume projection represented by the floor plan 33 depicted in FIG. 3(C) so that he or she may observe the floor plan 33 from any angle.

As further noted above, the network navigation and viewing system also provides a facility by which an operator can generate images which graphically depicting network traffic, in particular depicting computers, operating as clients in the network, which have open sessions with the computers that are operating as servers. This facility will be illustrated in connection with FIG. 4. With reference to FIG. 4, that FIG. depicts a screen image including icons 12i(1) through 12i(9), representing computers 12(1) through 12(9) in domains 20(1) and 20(2). In those domains, computers 12(4) and 12(7) represent servers, and the other computers represent clients. The icons 12i(4) and 12i(7) representing client computers are shown connected to icons 12i(1), 12i(2), 12i(3), 12i(6) and 12i(8) by lines 40(1) through 40(5), with line 40(2) comprising branches 40(2)(A) and 40(2)(B) and line 40(4) comprising branches 40(4)(A) and 40(4)(B).

Each line connecting an icon representing a client computer and an icon representing a server computer indicates that the client computer has at least one open session with that server computer, and a branched line (such as lines 40(2) and 40(4), each of which comprises two branches) indicates that the client computer has at least one open session with each of the server computers at which a branch terminates. Thus, lines 40(1) and 40(3) in FIG. 4 interconnecting icons 12i(1) and 12i(2), respectively, and icon 12i(4), indicate that there is at least one session between the respective client computers 12(1) and 12(2) and the server computer 12(4). The branched line 40(2) interconnecting the icon 12i(3) representing the client computer 12(3) and icons 12i(4) and 12i(7) representing both server computers 12(4) and 12(7) indicates that there is at least one session between the client computer 12(3) and each of server computers 12(4) and 12(7) represented by the respective icons.

Similarly, line 40(5) interconnecting icons 12i(8) and 12i(7) indicates that there is at least one session between the computer 12(8), as a client, and computer 12(7), as a server, and branched line 40(4) interconnecting the icon 12i(3) representing the client computer 12(6) and icons 12i(4) and 12i(7) representing both server computers 12(4) and 12(7) indicates that there is at least one session between the client computer 12(6) and each of server computers 12(4) and 12(7) represented by the respective icons. In one embodiment, which is shown in FIG. 4, the image does not indicate the number of sessions that a client computer has with a server computer; however, it will be appreciated that the number of sessions that a client computer has with a server may be indicated by providing a number of lines between the client and server computers or by providing lines of varying thickness with, for example, the relative thickness of the lines representing relative numbers of sessions.

Information as to those client computers which have open sessions with which server computers may be useful in determining whether sufficient network bandwidth capacity exists in the network or whether more should be provided, such as by providing additional communication links interconnecting certain computers or by dividing interconnecting the network so as to have additional domains, with fewer computers in each domain. In addition, this type of information may be useful in indicating whether more servers, or servers with larger capacity, should be provided, since, as servers have increased numbers of sessions, their response times to service requests from computers with open sessions may be increased. In addition, the information may be useful in indicating whether files should be reallocated among the servers, by moving files from one server to another or by providing copies of files on multiple servers, which may improve response time to service requests from client computers.

It will be appreciated that the network navigation and viewing system may provide numerous additional types of graphical images and additional features to the images as shown in FIGS. 2 through 4. For example, with respect to the images shown in FIGS. 2, 3B and 4, instead of just showing the icons 12i(n) in a static manner to show the presence of the respective computers 12(n) in the network 10, the images can provide information concerning the status of the computers 12(n) by showing the icons 12i(n) in, for example, a variable manner, with variations in the image indicating the differences in status. For example, the network navigation and viewing system can show computers' respective status such as operational, off and malfunctioning by depicting their respective icons 12i(n) in different colors or by depicting the operational computers with constant icons and the off and malfunctioning computers with icons that flash at different rates.

The types of information presented by the network navigation and viewing system and the graphical images generated thereby for a network such as network 10 is generally related to the types of information which it can obtain concerning the organization and operation of the network 10. Generally, in one embodiment in which the computers 12(n) utilize the Microsoft Windows™ operating system program, specifically, "Windows for Workgroups" product available from Microsoft Corporation, the operator's computer 12(o) (that is, the computer 12(n) which the network manager or other user who wishes to make use of the network navigation and viewing system to perform the graphical management operations described above) determines the identifications of the computers 12(n) in the network and their respective domains by means of a conventional call to the local area network operating system program. In that embodiment, all of the computers 12(n) in the network 10 which are able and authorized to make such a call will be able to obtain the computer identifications and enable their respective users to make use of the network navigation and viewing system.

It will be appreciated, however, that other arrangements may be used by which a computer 12(n) can obtain the computer identification and domain information. For example, a network may provide a facility by which a computer connected in the network can broadcast messages to other computers connected in the network, enabling the other computers to generate response messages containing their identifications and domain assignments, if any. When the first computer receives the response messages, it can establish a listing of the computer identifiers and their respective domains, which it can use in establishing the screen image such as in FIG. 2. Alternatively, each of the server computers in the system may maintain a listing of the computers 12(n) which can comprise their clients, along with the respective domains, and the operator's computer 12(o) can poll the servers to determine the various computers in the network and their respective domains.

With this background, the operations performed by the network navigation and viewing system will be described in connection with the flow-chart depicted in FIG. 5. With reference to FIG. 5, when the operator calls the network navigation and viewing system, which may occur from a direct call or from a call from a network management system, the operations that are performed by the network navigation and viewing system will depend on the particular network navigation and viewing system function as selected by the operator (step 100). If the operator selects a "generate domain organization image" function, enabling generation of a visual image such as depicted in FIG. 2, the network navigation and viewing system will initially determine the identifications of the computers 12(n) in the network and their respective domains 20(d) (step 101) as described above. After identifying the computers 12(n) and domains 20(d), the network navigation and viewing system will enable the operator's computer 12(o) to generate a visual image comprising the respective closed curves 21(d) and the icons 12i(n) representing the computers 12(n) in each domain 21 (d) (step 102). The network navigation and viewing system may enable the operator to thereafter manipulate and edit the image using conventional computer graphics tools and to perform a "save" operation to save the image, either as originally displayed or as edited (step 103). At some point, the operator may enable the network navigation and viewing system to return to the function selection step 101 to select a new function (step 104).

If in the function selection step 102 the operator selects an "assign computer icons to physical location" function, in which the operator may create an image such as that depicted in FIG. 3B, the network navigation and viewing system will allow the operator to identify an computer icon/domain assignment image, such as an image previously saved in step 103, or to enable the network navigation and viewing system to generate such an image (step 110). If the operator enables the network navigation and viewing system to generate an image, it (the network navigation and viewing system) will perform steps 101 through 103 to generate the required image (step 111). On the other hand, if the operator elects in step 110 to select a file containing a previously-saved icon/domain image, the network navigation and viewing system will call the file and display the image (step 112). Following either step 111 or step 112, the network navigation and viewing system will allow the operator to select a file containing a previously-generated image of a layout of the office area or other space in which the computers 12(i) are located, or to generate a such image (step 113). If the operator elects in step 113 to select a file, the network navigation and viewing system will call the file and display the image (step 114). On the other hand, if the operator elects in step 113 to generate a new layout image, the network navigation and viewing system will provide conventional computer graphics tools to allow the operator to generate an appropriate layout image (step 115). Following either step 114 or step 115, the network navigation and viewing system allows the operator to, by use of conventional "drag-and-drop" operations, manipulate the icons 12i(n) representing the respective computers 12(n) to move them as desired over the layout image (step 116). Contemporaneously, the operator may also use the computer graphics tools to perform other graphics operations in connection with the image. The operator may periodically save the image to a computer file (step 117) and when he or she is finished may return to the function selection step 100 to select a new function (step 118). The operator may perform these operations through a plurality of iterations, each in connection with a floor or other level in a volume in the enterprise, and thereafter link the images together to create a three-dimensional volume representation for the layout.

If in the function selection step 100 the operator selects the "view server usage" function, in which the network navigation and viewing system generates an image such as depicted in FIG. 4, the network navigation and viewing system will initially request the operator to identify the server or servers whose usage is to be displayed (step 120). After the operator identifies the desired server or servers (step 121), the network navigation and viewing system uses the network communication links to poll the identified server(s) to identify the various computers having sessions therewith as clients (step 122). Thereafter, the network navigation and viewing system will generate an image for display t o the operator similar to that depicted in FIG. 4, including icons representing the server computers and client computers and lines interconnecting each client computer with the server computer(s) with which it has a session (step 123). In addition, the network navigation and viewing system may show icons representing the computers 12(n) which do not have sessions with any of the servers; in that operation the network navigation and viewing system may perform step 101 described above to allow it to identify all o f the computers 12(n) in the network, which information it uses to determine the identifications of the computers 12(n) which were not identified in step 122. In any case, after the network navigation and viewing system has generated the image in step 123. it may also allow the operator may also use the computer graphics tools to perform other graphics operations in connection with the image. The operator may periodically save the image to a computer file (step 124) and when he or she is finished may return to the function selection step 100 to select a new function (step 125).

It will be appreciated that the network navigation and viewing system may allow the operator to generate images graphically representing other information which may be useful in managing the network 10. In that connection, it may in step 100 provide other functions that an operator may select.

The invention provides a number of advantages. In particular, it provides an arrangement by which a network manager or other operator may easily generate and manipulate graphical images representing the physical layout of a network under management, and view system usage. This may assist the operator to identify physical locations of computers 12(n) which have failed or which otherwise require maintenance, and to assist in determining whether network capacity needs to be increased.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network navigation and viewing system for use in connection with a network, the network including a plurality of digital devices interconnected by communication links, at least one of the devices comprising a server device, the network navigation and viewing system facilitating the generation of an communication pattern image depicting a communications pattern in the network, the network navigation and viewing system comprising:
   A. a server interrogation element for retrieving session information from said server device, said session information identifying ones of the devices having a processing session with said server device as a client device;
   B. a communications pattern graphic image generation element for using the session information in generating a communications pattern image for display to an operator, the communications pattern image comprising a plurality of icons each representing a server device or a client device and providing a visible association associating ones of the client devices having a communications session with each server device; and
   C. an operator control element responsive to the operator initiating a communications session image generation operation to enable the server interrogation element for retrieving, session information from said server device and the communications pattern graphic image generation element to use the session information in generating a communications pattern image.

2. A network navigation and viewing system for use in connection with a network, the network including a plurality of digital devices interconnected by communication links, at least one of the devices comprising a server device, the network navigation and viewing system facilitating the generation of an communication pattern image depicting a communications pattern in the network, the network navigation and viewing system comprising:
   A. a computer; and
   B. a control subsystem for controlling operations of the computer, the control subsystem comprising:
      i. a server interrogation control element for enabling the computer to retrieve session information from said server device, said session information identifying ones of the devices having a processing session with said server device as a client device;
      ii. a communications pattern graphic image generation control element for enabling the computer to use the session information in generating a communications pattern image for display to an operator, the communications pattern image comprising a plurality of icons each representing a server device or a client device and providing a visible association associating ones of the client devices having a communications session with each server device; and
      iii. an operator control element for enabling the computer, in response to the operator initiating a communications session image generation operation, to enable the server interrogation control element to, in turn, enable the computer to retrieve session information from said server device, and the communications pattern graphic image generation control element to, in turn, enable the computer to use the session information in generating a communications pattern image.

3. A control subsystem for use connection with a computer connected in a network, the network including a plurality of digital devices interconnected by communication links, at least one of the devices comprising a server device, the control subsystem enabling the computer to generate an communication pattern image depicting a communications pattern in the network, the control subsystem comprising:
   A. a server interrogation control element for enabling the computer to retrieve session information from said server device, said session information identifying ones of the devices having a processing session with said server device as a client device;
   B. a communications pattern graphic image generation control element for enabling the computer to use the session information in generating a communications pattern image for display to an operator, the communications pattern image comprising a plurality of icons each representing a server device or a client device and providing a visible association associating ones of the client devices having a communications session with each server device; and
   C. an operator control element for enabling the computer, in response to the operator initiating a communications session image generation operation, to enable the server interrogation control element to, in turn, enable the computer to retrieve session information from said server device, and the communications pattern graphic image generation control element to, in turn, enable the computer to use the session information in generating a communications pattern image.

4. A computer program product for use connection with a computer connected in a network, the network including a plurality of digital devices interconnected by communication links, at least one of the devices comprising a server device, the control subsystem enabling the computer to generate an communication pattern image depicting a communications pattern in the network, the computer program product comprising a computer-readable medium including:

A. server interrogation control element code devices for enabling the computer to retrieve session information from said server device, said session information identifying ones of the devices having a processing session with said server device as a client device;

B. communications pattern graphic image generation control element code devices for enabling the computer to use the session information in generating a communications pattern image for display to an operator, the communications pattern image comprising a plurality of icons each representing a server device or a client device and providing a visible association associating ones of the client devices having a communications session with each server device; and C. operator control element code devices for enabling the computer, in response to the operator initiating a communications session image generation operation, to enable the server interrogation control element code devices to, in turn, enable the computer to retrieve session information from said server device, and the communications pattern graphic image generation control element code devices to, in turn, enable the computer to use the session information in generating a communications pattern image.

5. A method of controlling a computer connected in a network, the network including a plurality of digital devices interconnected by communication links, at least one of the devices comprising a server device, the control subsystem enabling the computer to generate an communication pattern image depicting a communications pattern in the network, the method comprising the steps of:

A. enabling the computer to retrieve session information from said server device, said session information identifying ones of the devices having a processing session with said server device as a client device; and B. enabling the computer to use the session information in generating a communications pattern image for display to an operator, the communications pattern image comprising a plurality of icons each representing a server device or a client device and providing a visible association associating ones of the client devices having a communications session with each server device.

\* \* \* \* \*